Sept. 17, 1968  A. R. WILLIAMS ET AL  3,401,984
VEHICLE BRAKE CONTROL
Filed Jan. 24, 1967  3 Sheets-Sheet 3
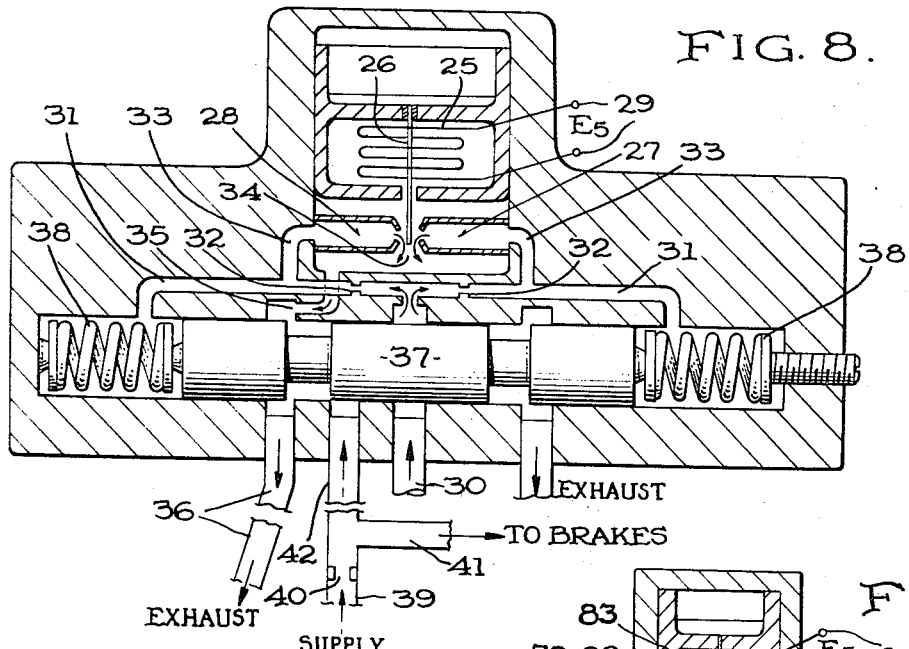
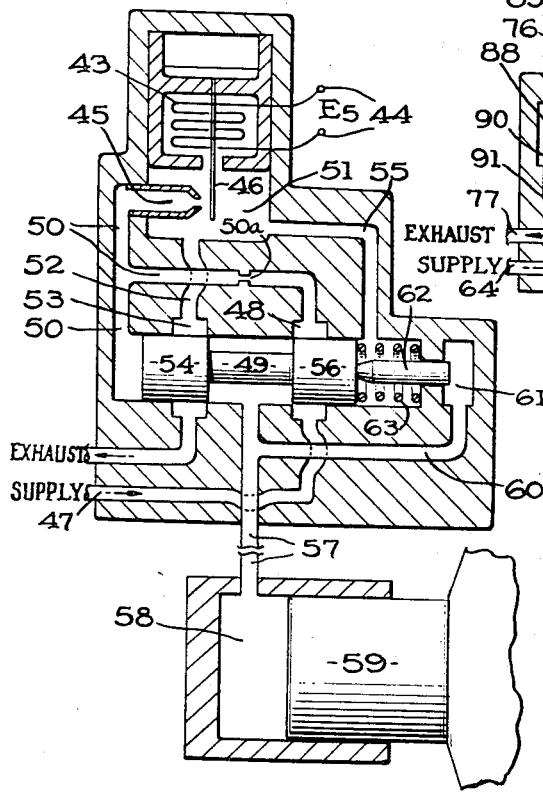
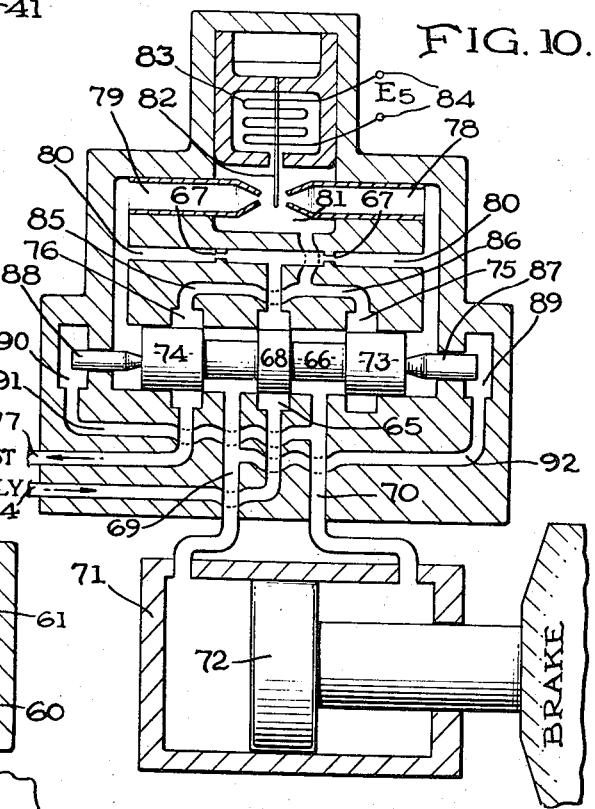

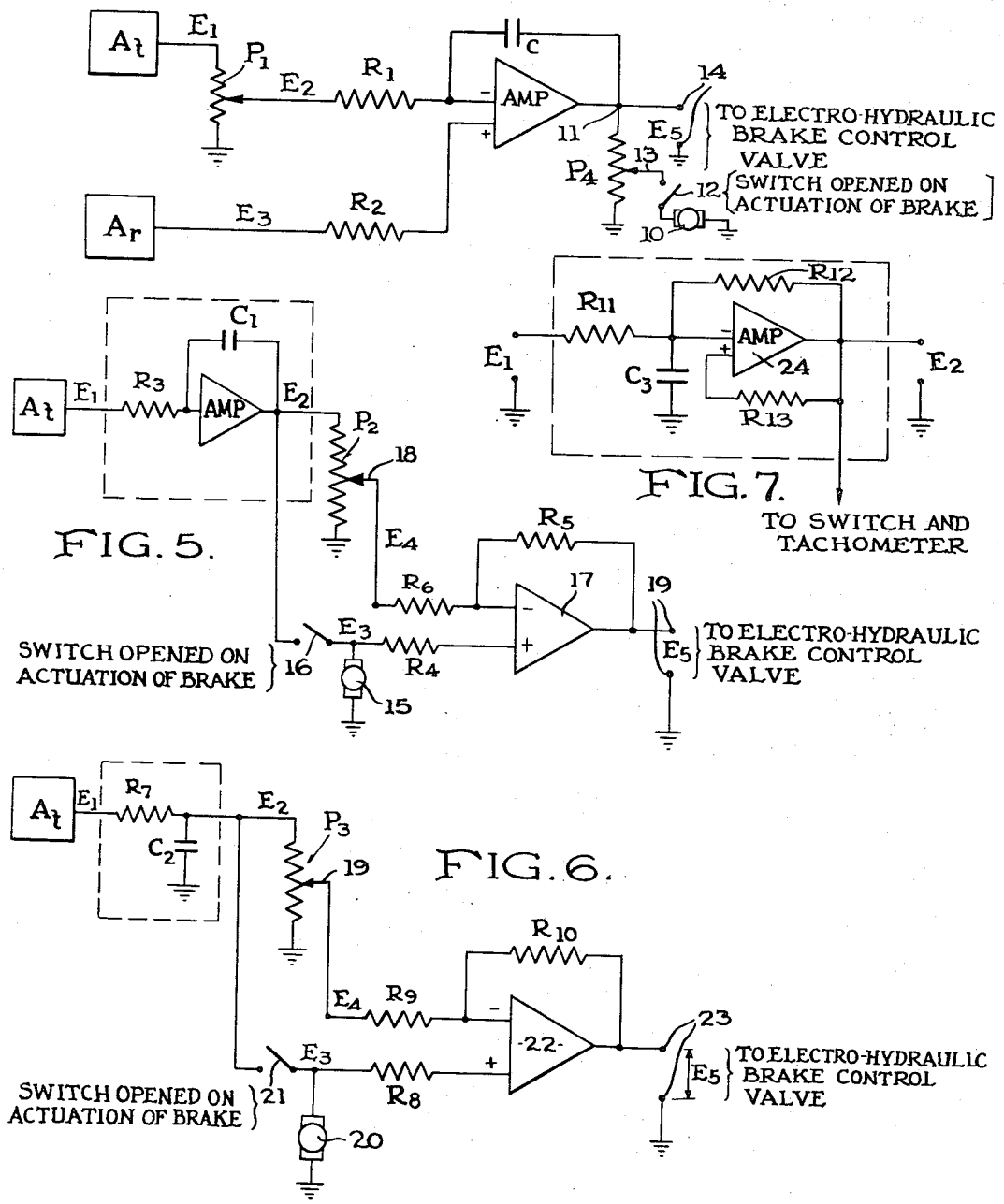

3,401,984
VEHICLE BRAKE CONTROL
Allison R. Williams, deceased, late of Vicksburg, Miss., by Henriette Le Corre Williams, Elizabeth Williams Bullard, and Ann Williams Flowers, executors, Vicksburg, Miss., and Karl N. Reid, Jr., Stillwater, Okla., and Richard H. Frazier, Winchester, and Bruce D. Wedlock, Arlington, Mass., assignors to Henriette L. Williams, Elizabeth W. Bullard & Ann W. Flowers, executors of the last will and testament of Allison R. Williams, deceased
Filed Jan. 24, 1967, Ser. No. 611,479
12 Claims. (Cl. 303—21)

ABSTRACT OF THE DISCLOSURE

Control of applied fluid braking pressure during braked vehicle deceleration according to the value of the slip ratio $$\frac{V_t - V_r}{V_t}$$

where $V_t$ is the vehicle translational velocity and $V_r$ is the wheel rotational velocity.

---

This invention relates to control of the braking process that occurs on application of the wheel brakes of a moving vehicle, so as to maintain optimum braking conditions between the wheel and the vehicle supporting surface during the stopping transient, i.e., that period of changing conditions during which the vehicle decelerates and comes to a stop.

Heretofore, various brake control systems have been devised with the general objective of relieving the brake pressure in case of undue slippage between the wheel and the supporting surface, so as to reduce wear and tear on the wheel surface (often a rubber tire tread) and to minimize the hazards of skidding, which often has disastrous consequences.

For example, U.S. Patent No. 2,529,985 granted November 14, 1950, to Allison R. Williams disclosed a control system in which two accelerometers, responsive respectively and independently to linear and angular wheel accelerations (i.e., negative accelerations or decelerations), produced equal and opposite counteracting signals as long as true rolling contact was maintained between the wheel and its supporting surface. In the case of slippage on the application of the brakes, however, the angular acceleration signal predominated and a significant difference between the two signals was used to proportionately reduce the brake pressure. In fluid pressure brake systems, this can be done conveniently by means of bleeding the fluid pressure line to the brake. Various arrangements were proposed for obtaining and comparing the two signals, both electrical and mechanical or hydromechanical.

In later related patents, such as No. 2,920,924, granted Jan. 12, 1960 to James B. Reswick and Allison R. Williams, additional provision was made for a bleed valve having enough lap that the valve did not begin to open until after a desired predetermined range of rate of change of slippage (10–15%) was reached.

While similar to such prior brake control systems in the use of a fluid pressure bleed valve, the present invention is predicated on the new concept of regulating the position of the valve according to the value of a "slip ratio," a function which is identified hereinafter by the letters S and defined as $$S = \frac{V_t - V_r}{V_t} \quad (1)$$

where $V_t$ = translational velocity of an appropriate point on the vehicle (generally the linear velocity of the vehicle at the axis of rotation of a braked wheel or at the center of gravity of the vehicle).

$V_r$ = rotational velocity for a braked wheel in contact with its supporting surface, defined as the product of angular velocity of the wheel, $\omega$, and the effective radius of the wheel, $r$; it is implied here that the wheel actually makes a "footprint" on its supporting surface.

Figure 1:
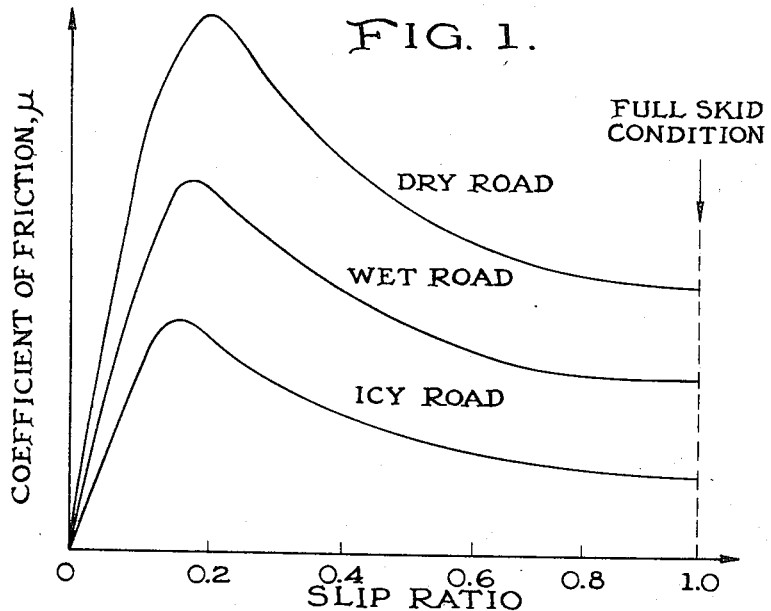
Figure 2:
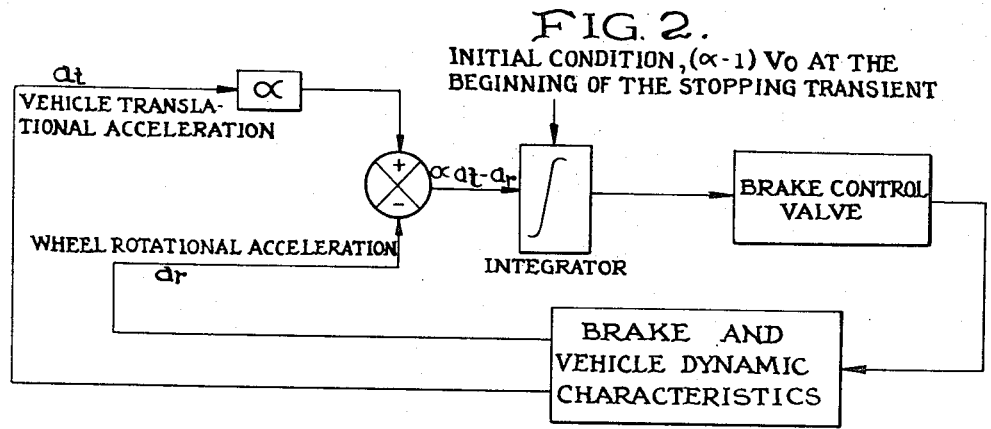
Figure 3:
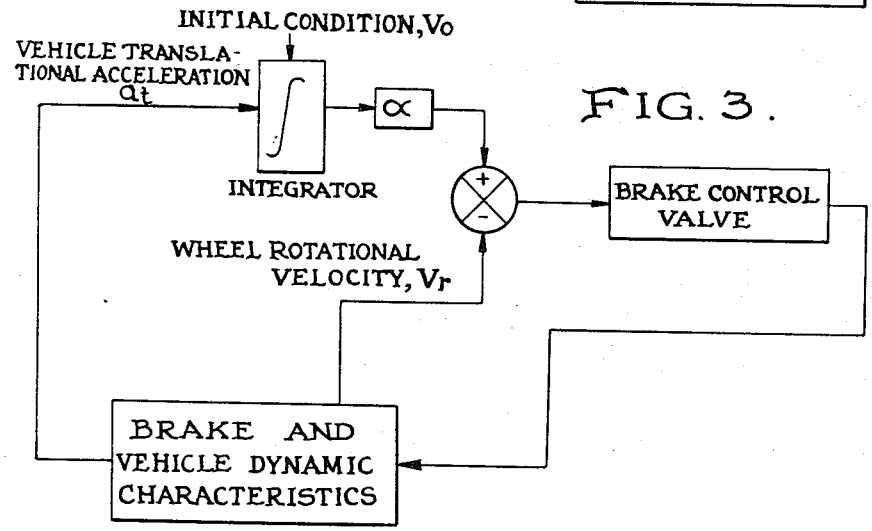

This new method of brake control has very important advantages over the prior art briefly set forth above, which can be explained more clearly by reference to the accompanying drawings in which FIG. 1 shows typical variations in the coefficient of friction between the wheel tread and its supporting surface when plotted against slip ratio S;

FIGS. 2 and 3 are schematic illustrations of the principal components of control systems based on the slip ratio method; and FIGS. 4, 5, 6 and 7 show diagrammatically several forms of electronic control systems based on the slip ratio method and embodying the invention; and FIGS. 8, 9 and 10 shows dirgrammatically several types of control valves that are suitable for use in the invention.

As disclosed in prior patents, it appears that the coefficient of friction between a rubber vehicle tire and its supporting surface reaches a maximum value at a certain degree of slippage (depending to some extent on operating conditions). It can be seen that this maximum determines the optimum value of the slip ratio S in any given case.

It has now been determined, as shown by the typical curves in FIG. 1, that this optimum value of S is approximately the same for widely differing road conditions, as shown by a comparison of the points on the horizontal axis at which the peaks of the curves occur. In other words, the optimum value of S for such varying conditions is approximately constant, and slip ratio can be set equal to a constant $k$ for optimum results:

$$\frac{V_t - V_r}{V_t} = k$$

or $$V_t(1-k) - V_r = 0 \quad (2)$$

Under the typical conditions illustrated by FIG. 1, the value of $k$ should be in the range of $0 < k < 0.2$ and preferably close to but not exceeding a value corresponding to the peak value of the coefficient of friction for the average condition.

It is assumed that $V_t = V_r$ at the instant of application of the brakes, and it will be seen that a control system which enforces Equation 2 thereafter, as rapidly as possible consistent with the control dynamics, with proper regard to the initial conditions ($V_{t0}$ and $V_{r0}$) existing when the system is activated, will produce an optimum stopping transient. There are two general schemes for implementing such a control system:

(a) Integrated acceleration difference

This system is shown schematically in FIG. 2. In this system, accelerometers are used to sense the vehicle translational acceleration and wheel rotational acceleration. A proportioned difference between these accelerations is taken, the result is integrated taking into account the initial condition when the system is activated, and the resulting proportioned velocity difference is used to control the brake pressure, If $V_r$ is too high, the brake pressure is proportionately increased and if $V_r$ is too low, the brake pressure is proportionately reduced. Thus, the control system will tend to bring about the condition expressed by Equation 2 in the form, $$\int (\alpha \dot{V}_t - \dot{V}_r)dt + (\alpha - 1)V_0 = 0 \quad (3)$$

where $\alpha$ is a constant equal to $(1-k)$ and the initial velocity $V_0 \equiv V_{t0} \equiv V_{r0}$. The acceleration signals, summing operation, and integration may be in any medium (i.e., mechanical, hydraulic, electrical, etc.).

(b) Integrated vehicle acceleration system

Another general scheme which is preferred for most purposes is shown schematically in FIG. 3. This system uses an accelerometer to measure the translation vehicle acceleration. This signal is integrated with suitable attention to the initial condition and multiplied by the constant $\alpha$. The wheel rotational velocity signal, which is directly measured with a tachometer or the like, is then subtracted from the modified vehicle translational velocity signal and the resulting signal used to control the brake pressure.

In equation form, this control system tries to bring about the condition, $$\alpha[\int \dot{V}_t dt + \dot{V}_{t0}] - V_r = 0 \quad (4)$$

Again, the operations may be accomplished in any medium.

FIG. 4 shows by way of example an electronic control system based on the scheme shown in FIG. 2, and FIGS. 5, 6 and 7 show by way of example electronic control systems based on the scheme shown in FIG. 3. Other control systems based on the slip ratio method but operating hydromechanically, hydraulically and/or pneumatically are disclosed and claimed specifically in other copending application.

The two accelerometers which sense the vehicle and wheel accelerations in systems based on the scheme illustrated by FIG. 2 and Equation 3 and its accompanying explanation above may be of any suitable type. When such a system operates electronically, however, they should produce electrical signals proportional respectively to the vehicle translational acceleration $a_t$ and to the wheel rotational acceleration $a_r$. Various types of such sensing devices are known in the art, as illustrated, for example, by the prior patents mentioned above. Such signals are then subtracted from one another by suitable circuitry to produce a differential that is integrated as explained above.

FIG. 4 shows by way of example one system of the above type in which the indicated voltages $E_1$ to $E_5$ are as follows:

$E_1 \equiv$ voltage proportional to vehicle translational acceleration, $a_t$
$E_2 \equiv$ voltage proportional to $\alpha\, a_t$
$E_3 \equiv$ voltage proportional to wheel rotational acceleration, $a_r$
$E_4 = E_3 - E_2$
$E_{5_0} \equiv$ voltage proportional to proportioned initial velocity at beginning of stopping transient, $(\alpha-1)V_0$ (consider initial value only)

$$E_5 = -\frac{1}{C} \int \left( \frac{E_2}{R_1} - \frac{E_3}{R_2} \right) dt + E_{5_0}$$

$E_5 \equiv$ voltage proportional to proportioned velocity difference, $(\alpha V_t - V_r) + (\alpha - 1)V_0$ (All voltages are referenced to ground.)

Referring now to FIG. 4, an accelerometer indicated diagrammatically as $A_t$ comprises an electromechanical device responsive to vehicle translational acceleration $a_t$ and produces the voltage $E_1$ proportional to $a_t$; this voltage is proportioned through the variable potentiometer $P_1$ to introduce the value $\alpha$ and to produce voltage $E_2$ proportional to $\alpha\, a_t$. Another accelerometer indicated diagrammatically as $A_r$ comprises an electromechanical device responsive to wheel rotational acceleration $a_r$ ($r$ times $dw/dt$), and produces the voltage $E_3$ proportional to $a_r$. Voltages $E_2$ and $E_3$ are transmitted through resistances $R_1$ and $R_2$ to the amplifier "AMP," the resulting difference $(E_2 - E_3)$ being proportional to the integrand in Equation 3. The resistances can be sized to introduce the desired value of $\alpha$ in which case the potentiometer $P_1$ would be unnecessary, but preferable $R_1 = R_2$ and $P_1$ is used to introduce the desired value of $\alpha$, thereby making $\alpha$ adjustable according to the operating conditions.

Any suitable type of integrating circuit can be employed to integrate the voltage difference $E_2 - E_3$ with respect to time. In the form shown in FIG. 4, this circuit comprises the amplifier designated "AMP" and capacitive feedback provided by a capacitor C.

In order to satisfy Equation 3, it is necessary to combine the first term of the equation (i.e., the integral already described) with the second term of the equation which is preferably accomplished by placing an initial charge on the capacitor C. As shown, tachometer 10 is connected to a node 11 through a switch 12 and an adjustable potentiometer $P_4$ having a movable contact 13. When the switch 12 is closed, the tachometer applies the voltage $E_{5_0}$ to the capacitor C to charge it initially, the position of contact 13 being adjusted so that $E_{5_0}$ is proportional to $(\alpha-1)V_0$. At the instant that the brakes are applied, however, the switch 12 is opened in any suitable way, as by mechanical linkage to the brake operating pedal or by fluid pressure actuation. Thereafter, the system functions as an integrator, with an initial charge on capacitor C corresponding to the second term of Equation 3.

The output voltage $E_5$ across the terminals 14 can be used to control the braking pressure by connecting these terminals to any desired type of electrohydraulic brake control valve such as one of those described below. Evidently, as long as this output voltage remains 0, there will be no effect on the braking pressure, but as soon as the condition expressed by Equation 3 is disturbed, there will be an output across the terminals 14 which will adjust the braking pressure in such a way that the condition expressed by Equation 3 tends to be restored.

FIGS. 5 and 6 show electronic control systems based on the scheme illustrated by FIG. 3 and its explanation set forth above. In both FIGS. 5 and 6, the voltages are as follows:

$E_1 \equiv$ voltage proportional to vehicle translational acceleration, $a_t$ $$E_2 \cong \frac{1}{R_3 C_1} \int E_1 dt + E_{30}$$

$E_{30} \equiv$ voltage proportional to initial translational velocity, $V_{t0}$
$E_3 \equiv$ voltage proportional to rotational velocity of wheel, $V_r$
$E_4 \equiv$ voltage proportional to $(1-k)(V_t + V_{t0})$
$E_5 \equiv$ voltage proportional to proportioned velocity difference, $(\alpha V_t - V_r) + V_{t0}$ (All voltages are referenced to ground.)

Referring now to FIG. 5, the accelerometer designated $A_t$, as in the case of FIG. 4, may comprise any suitable electromechanical accelerometer responsive to vehicle translational acceleration $a_t$ and producing an electrical signal $E_1$ which is proportional to this acceleration. This signal is transmitted to a suitable integrating circuit which in the form shown comprises resistance $R_3$, a suitable amplifier designated AMP, and a feedback capacitor $C_1$, this integrating circuit producing an output $E_2$ as defined above.

In order to take into account the initial condition at the beginning of the stopping or braking transient, a suitable tachometer or like device 15 rotates with the wheel and produces a voltage $E_3$ (or $E_{30}$) that is proportional to the wheel rotational velocity $V_r$. Prior to the application of the brakes, this voltage ($E_{30}$) is transmitted through a switch 16 to the output side of the integrating circuit so as to charge the capacitor $C_1$, but upon actuation of the brakes, the switch 16 is opened in any suitable manner as in the case of the switch 12 of FIG. 4. At the beginning of the braking transient therefore, the capacitor $C_1$ is charged with voltage $E_{30}$ and thereafter the voltage $E_3$ produced by tachometer 15 is transmitted through resistance $R_4$ to a suitable amplifier 17 provided with resistive feedback through a suitable resistor $R_5$. At the same time, the output voltage $E_2$ of the integrating circuit is connected through a potentiometer $P_2$ to ground, the setting of the movable contact 18 of this potentiometer being such as to provide the voltage $E_4$ proportional to $(1-k)(V_t+V_{t0})$, as indicated above. This voltage $E_4$ is transmitted through a suitable resistor $R_6$ to the amplifier 17 where it is combined with the voltage $E_3$. The difference between the voltages $E_4$ and $E_3$ is amplified to provide a voltage $E_5$ proportional to the proportioned velocity difference $(\alpha V_t - V_r) + \alpha V_{t0}$. This output is applied to the output terminals 19 of the system which, as in the case of FIG. 4, are preferably connected to a suitable electrohydraulic brake control valve.

The system shown in FIG. 6 is similar to that shown in FIG. 5 except for the substitution of a somewhat different type of integrating circuit. In FIG. 6, the accelerometer $A_t$ responsive to vehicle translational acceleration produces a voltage $E_1$ proportional to this acceleration. This voltage $E_1$ is applied to the integrating circuit comprising a resistor $R_7$ and a grounded capacitor $C_2$. The integrated output $E_2$ is connected to a variable potentiometer $P_3$, the movable contact 19 of which is adjusted to produce the voltage $E_4$. Tachometer 20 similar to the tachometer 15 of FIG. 5 is connected through a switch 21 to the output side of the integration circuit so that at the beginning of the braking transient, the capacitor $C_2$ is charged with a voltage $E_{30}$ proportional to the initial translational velocity. At this instant, the switch 21 is opened as in the cases of the switch 16 of FIG. 5 and the switch 12 of FIG. 4, after which the tachometer voltage $E_3$ proportional to the rotational velocity of the wheel $V_r$ is transmitted through resistor $R_8$ to the amplifier 22, while voltage $E_4$ is transmitted through resistor $R_9$ to the amplifier. The amplifier 22 can be of any suitable type, being provided with resistive feedback through a suitable resistor $R_{10}$. As in the case of FIG. 5, the voltages $E_3$ and $E_4$ are subtracted and amplified to produce an output voltage $E_5$ proportional to the proportioned velocity difference $(\alpha V_t - V_r) + \alpha V_{t0}$, being applied to the output terminals 23 which are preferably connected to a suitable electrohydraulic brake control valve.

FIG. 7 illustrates another known type of integrating circuit which can be substituted for the integration circuits described above in FIGS. 4, 5 and 6. The integration circuit of FIG. 7, sometimes referred to as a "bootstrap" circuit, comprises a resistor $R_{11}$ through which the input voltage $E_1$ (as defined above) is transmitted to a grounded capacitor $C_3$ and an amplifier 24. Resistive feedback is provided by a suitable resistor $R_{12}$. This integration circuit produces an output voltage $E_2$ as defined above in connection with FIG. 5.

It will be evident to those skilled in the art that the choice of the type of integrating circuit to be employed, as well as the choice between the two schemes illustrated by FIGS. 2 and 3, will depend upon the conditions existing in any particular case. It may be observed, for example, that the system of FIG. 3 requires only one accelerometer as compared with two in the system of FIG. 2; that the integration circuit of FIG. 6 does not employ an amplifier, unlike the integration circuits of FIGS. 4 and 5; but those skilled in the art will understand, on the other hand, that the capacitor in FIG. 6 has to be rather large in comparison with that of FIG. 5; etc.

It should also be understood that the optimum value of slip ratio that is to be maintained can vary somewhat depending upon conditions encountered in practice, both as to the supporting surfaces and the vehicle itself. In FIG. 1, the optimum or peak values under different road conditions are only approximately the same so that, to a certain extent, it is necessary to use an average value that should be close to but preferably not in excess of any of the peak values that may be encountered in service. Also, the curves shown in FIG. 1, while typical, do not necessarily apply to all vehicles, even assuming the same supporting surface. Thus, minor variations in the optimum value of S (or $k$) may occur in different cases. One of the important advantages of the systems described above is that such variations can be taken into account by adjustment of the potentiometer settings, i.e., by "tuning" each system for the particular vehicle on which it is installed and for the average road conditions to be encountered.

As to the electrohydraulic brake control valve, various types of such valves are known and again the selection of the one to be employed for the purposes of the invention will depend upon the condition of each particular case. Such valves may have one stage or two stages of amplification. In general, in connection with such valves, reference may be had to the article entitled "What To Look for in . . . Electrohydraulic Servo Valves," by B. A. Johnson et al., published in "Control Engineering" for June 1956; also well known texts in this field and standard reference works such as McGraw-Hill Encyclopedia of Science and Technology.

FIGS. 8, 9 and 10 illustrate schematically three such valves, any one of which can be used together with any one of the control systems illustrated in FIGS. 4, 5, 6 and 7. FIG. 8 shows a known type of "pressure-flow" valve, i.e., for a given input voltage signal there will be a pressure output which depends on the input as well as the output flow rate. In this figure, the valve casing or body houses a suitable electromechanical actuator with a coil 25 and associated structure which control the position of a flapper 26 interposed between the two nozzles 27 and 28, the terminals 29 of the actuating coil 25 being connected to the output of one of the electronic systems described above. The flapper 26 will be maintained in neutral position between the nozzles as long as the desired value of slip ratio and the condition defined by Equation 3 or Equation 4 are maintained. Fluid under pressure is supplied through a pipe 30, valve passages 31 each containing a flow restriction orifice 32, and passages 33 to the chambers of the nozzles 27 and 28, and the fluid escaping from the nozzles collects in a chamber 34 from which it escapes through a drain passage 35 and an exhaust pipe 36. The pressures in the nozzle chambers 27 and 28 are also communicated by the passages 31 to the opposite ends of a bore in the valve body which houses a slidable valve spool 37. When the electrical input to the coil 25 is zero, the corresponding equal and oppositely acting fluid pressures on the ends of the valve spool tend to maintain it in neutral position, together with springs 38 one at each end of the spool.

When the brake is applied, fluid supply pressure is applied in line 39, connected to the upstream side of orifice 40. A line 41 is connected to the downstream side of orifice 40, to the fluid brake cylinder(s), and to a bleed line 42 which leads to the valve body and which is normally closed by the valve spool 37 in its neutral position. It will be seen, however, that when the actuator coil 25 is energized, by an output voltage generated in the electronic system in case of departure from the optimum value of the slip ratio, the flapper 26 will be shifted, relative to the nozzles 27 and 28, so that the pressures at the ends of the valve spool become unbalanced and the spool will shift longitudinally in its bore until the pressure and spring forces on the valve spool are balanced, so as to open the bleed line 42 through the valve to the exhaust 36 and to reduce the pressure applied to the brakes through line 41. The amount of motion of the spool will be proportional to the output of the electronic system, which in turn will be proportional to the departure from the desired slip ratio value, so that the amount of reduction of brake pressure is also in proportion to the variation of slip ratio. This reduction in brake pressure tends to allow $V_r$ to increase, bringing the value of the slip ratio back toward its desired optimum value. As this takes place, the output of the electronic system is reduced at the same time and the flapper 26 tends to move back to neutral position and thus to equalize the pressure in the chambers at the ends of the valve spool, whereupon the springs 38 tend to return the spool to its neutral position, thereby reducing the amount of bleeding of brake pressure.

Correspondingly, if operation exists at some particular slip ratio condition which is smaller than the "optimum" value, the valve spool will be caused to close, thereby allowing $V_r$ to decrease.

FIGS. 9 and 10 show two types of "pressure-control" or "pressure feedback" valves where the output pressure depends primarily on the input signal and is relatively independent of the output flow rate. In FIG. 9, the valve body houses an electromagnetic actuator with a coil 43, the terminals 44 of which are connected to the electronic system output. In this pressure control valve, the opening of a single nozzle 45 is controlled by a flapper 46, the position of which depends upon the voltage applied across the terminals 44. Fluid under pressure is supplied to the valve through a valve fluid supply passage 47, and fluid pressure is applied through a circumferential channel or groove 48 in the inner surface of a bore in which a valve spool 49 is slidably mounted and to the upstream side end of an orifice 50a in a line 50 which connects the downstream side of the orifice to a nozzle 45 and to the chamber located at the left end of valve spool land 53. Fluid escapes through nozzle 45 to a chamber 51 from which it is drained to "Exhaust" through valve passage 52 and circumferential groove 54.

In the neutral or generally closed position of valve spool 53, 49, 56 shown in FIG. 9, the valve land 53 at one end of the valve spool (the left hand end) partially or totally closes the connection between the brake line 57 and the exhaust line. Pressure in the drain chamber 51 is applied by means of a valve passage 55 to one end of the bore at one end of the valve spool, while pressure within the nozzle chamber 45 is applied by means of a branch of passage 50 to the opposite end of the bore so that the differential pressure across the variable orifice formed by the nozzle 45 and flapper 46 is applied to the valve spool. It will be understood that in its neutral position, the valve land 53 may have a slight overlap or underlap or line-to-line contact depending on the actual performance required by the overall system. The pressure in chamber 51 may be low (i.e., atmospheric), or in the case of a pressurized reservoir the pressure in this chamber may be constant and intermediate between atmospheric and the main supply pressure.

At the other end of the valve spool, in its neutral position, the land 56 cooperates with the circumferential passage or groove 48 so that the main fluid supply from passage 47 is partially or totally shut off from the space around the central reduced part of the valve spool, which space is connected by a line 57 to the end of a brake cylinder 58. Pressure in the cylinder chamber 58 acts on the end of the brake operating ram 59. At the same time, the pressure in chamber 58 is applied by means of valve passage 60 to a chamber 61 at the right hand end of the valve bore where it acts on the end of valve stem 62, thus supplementing the differential pressure and preferably also a spring 63 in the adjacent end of the bore. The pressure acting on the valve stem 62 represents the pressure feedback from the brake cylinder.

It will be seen that as long as the valve spool force due to pressure in the nozzle chamber 45, which acts on one end of the valve spool, is balanced by the force due to the pressure in the drain chamber 51, the force due to pressure in the chamber 61 and the force of spring 63 all acting on the other end of the valve spool, the neutral position of the valve spool as shown in the drawing will be maintained and the constant supply pressure will be effective on the ram 59 to apply the brake. In case $V_r$ should decrease unduly and disturb the condition established by Equation 3 or Equation 4, however, the signal transmitted from the electronic system to the actuator coil 43 will cause the flapper 46 to move in a direction which decreases the differential between the pressures existing in the nozzle chamber 45 and the drain chamber 51. This change will unbalance the pressures acting on the valve spool so that it tends to move to the left, as seen in the drawing, resulting in a controlled bleeding of the brake pressure in line 57 and chamber 58 by opening the variable orifice formed between the valve land 53 and the circumferential groove 54. As the pressure in line 57 decreases the force resulting from this pressure acting on stem 62 decreases and the valve spool tends to move back to the right toward its neutral position. Consequently, due to this load pressure feedback effect the valve functions to maintain a pressure in brake cylinder 58 directly proportional to the signal applied to the valve coil 43 which is in turn proportional to the extent of deviation of the actual slip ratio from the optimum value. The maximum pressure in chamber 58 is approximately equal to the supply pressure in line 47, except for the effect of system leakage. This maximum exists in the period of steady state operation when no electrical signal is applied to the input terminals 44. This chamber pressure is proportionately reduced as the electrical signal input is increased. At the same time a decrease in the pressure applied to the brake ram 59 tends to cause $V_r$ to increase again, which in turn decreases the signal to the actuating coil 43 of the valve so that the valve spool tends to return to its neutral position and the balance of forces acting on the spool tends to be re-established as the optimum slip ratio condition is approached.

FIG. 10 shows another type of "pressure-control" valve having a double-acting cylinder and piston for operating the brake but which has the same general effect and function as the valve in FIG. 9.

In FIG. 10, the constant pressure supply fluid enters the valve body through a supply passage 64 which leads to a circumferential groove or channel 65 in the wall of a bore in which a valve spool 66 is slidably mounted, and to the upstream sides of fixed orifices 67. In the neutral position shown, valve land 68 and groove 65 form a variable metering orifice such that fluid is partially or totally restricted from passing into the bore spaces at the left and right of land 68, which spaces are connected by passages 69 and 70 with the opposite ends of a brake operating cylinder 71 and piston 72. Also in the neutral position shown, valve lands 73 and 74 and their associated grooves 75 and 76 form variable metering orifices such that fluid is partially or totally restricted from passing from the two ends of the brake cylinder into the exhaust line 77. It is understood that in the neutral position the valve may be slightly underlapped or overlapped or it may be "line-to-line."

Two nozzles 78 and 79 in the valve body are connected to the downstream sides of their associated fixed orifices 67 by means of passages 80. The pressures existing in the nozzle chambers 78 and 79 are also transmitted to the opposite ends of the valve spool through branches of the passages 80. The discharge from the nozzles into a drain chamber 81 is controlled by a flapper 82 and an electromagnetic actuating coil 83, the input terminals 84 of which are connected to one of the electronic control systems shown in FIGS. 4, 5, 6 and 7 or an equivalent thereof. Escape of fluid from the drain chamber 81 to exhaust takes place through valve passage 85, circumferential groove 76 around the valve land 74 at the left hand end of the valve spool, and drain passage 77. Also the passage 85 is connected to the grooves 75 by a passage 86.

It will be seen, therefore, that with the valve in the position shown in the drawing, when the source of constant supply pressure is applied to the valve, the valve will adjust itself due to the action of the pressure feedback from the two brake cylinder chambers, such that a differential pressure acts on the piston 72 to apply the brakes. That is a function of the constant supply pressure, the drain pressure in the nozzle discharge chamber 81 and the effective area of the piston. This self adjusting feature of the valve is similar in function as that associated with the simpler pressure feedback valve in FIG. 9. The maximum differential pressure developed across the piston 72 is approximately equal to the difference between the supply and exhaust pressures and occurs in steady-state operation when the electrical input applied across terminals 84 is zero. This differential pressure is proportionately reduced as the signal to terminals 84 is increased. In the event that the braking effect obtained in this way should result at any time in disturbing the condition expressed by Equation 3 or Equation 4, however, the nozzles 78 and 79 and the flapper 82 are effective as explained below to shift the valve spool in such a manner as to compensate for the disturbance and to restore the desired condition by reducing (or increasing in cases where operation is below optimum slip ratio) the differential pressure on the piston 72.

In order to maintain the spool normally in the position shown in the drawing, springs can be used as shown in FIGS. 8 and 9, but in the case of FIG. 10 feedback pressures from the opposite sides of the piston 72 are employed for this purpose. Referring to the figure, valve stems 87 and 88 project from the opposite ends of the valve spool into chambers 89 and 90, respectively. These valve stems have different cross-sectional areas; the smaller (left hand) stem 88 is subjected in chamber 90 to feedback pressure from the right hand side of the piston 72 via valve passages 70 and 91. The larger (right hand) valve stem 87 is subjected in chamber 89 to feedback pressure from the left hand side of piston 72 via valve passages 69 and 92.

The operation of the valve in FIG. 10 will be understood from what has already been said in connection with FIGS. 8 and 9. With the valve in the position shown in the drawing, the effective brake pressure is the differential between the two sides of the piston 72, as already explained. Should this pressure result at any time during the stopping transient in an undue decrease of $V_r$, the resulting output of the electronic control system will energize the actuating coil 83 and adjust the position of the flapper 82 so as to unbalance the pressures in the nozzle chambers 78 and 79. The pressures in passages 80 and on the right and left hand ends of the valve spool will change correspondingly, and the result will be a shift of the valve spool, say to the left (for a decrease of $V_r$ from optimum), so as to open the orifices formed between grooves 76 and 65 and the corresponding lands 74 and 68 and thus bleed off to some extent the brake pressure effective through passage 69 on the piston head and to increase the pressure on the right side of the piston, the overall result being a decrease in the effective braking force. Consequent decrease in braking effect tends to cause $V_r$ to increase and the output of the electronic system to decrease correspondingly so that the flapper 82 tends to return to its neutral position; the valve spool then tends to return to its neutral position as the pressure balance throughout the valve system is restored.

Correspondingly, should $V_r$ become too high for any reason, the resulting change in the output of the electronic system will adjust the position of the flapper 82 so as to unbalance the pressures in the nozzle chambers in the opposite sense and to cause the valve spool to shift in the opposite direction, say to the right. This movement will open the orifices formed between the grooves 75 and 65 and their associated lands 73 and 68 and thus bleed off to some extent the brake pressure effective through passage 70 on the piston head, by way of the groove 75 and passages 86 and 85. In this case the overall result is an increase in the effective braking force which causes $V_r$ to decrease. The output of the electronic system increases correspondingly so that the flapper 82 and the valve spool again tend to return to their neutral positions.

The advantage of valves in FIG. 9 and FIG. 10 as contrasted to that in FIG. 8 is that the former are true pressure control valves and as such tend to control the effective force on the piston directly proportional to the electrical signal input, regardless of the flow rate demanded from the valve.

It will be evident to those skilled in the art that a system embodying the invention can be used in various ways. For example, a single control system at any given wheel, in which a single vehicle translational velocity is compared with a single rotational velocity of the specific wheel, can be used if desired to control the brake pressure in the wheel cylinders of a group of braked wheels. Such a single system may be sufficient on vehicles having an all-wheel drive or transmission that prevents the wheels from locking or spinning independently, or such a drive or transmission for part but not all of the wheels (usually the rear wheels).

On the other hand, it may be preferable to employ separate control systems at each braked wheel so as to determine independently the slip ratios existing at each wheel. In such cases, the brake pressure can be independently controlled at each braked wheel, on the basis of the particular proportioned velocity difference at each wheel; or a brake pressure common to all braked wheels could be controlled on the basis of an averaged effect of the various proportioned velocity differences at several wheels. Otherwise, the rotational velocity of each braked wheel could be be measured and the average then compared with the translational velocity of the vehicle as a whole measured by integrating the translational acceleration of any desired particular point on the vehicle.

What is claimed is:

1. Means for controlling the fluid pressure in a pressure-operated braking system of a wheeled vehicle so as to maintain, during a braking transient, an approximately constant optimum value of the slip ratio $$\frac{V_t - V_r}{V_t}$$

between a wheel and its supporting surface, where $V_t$ is the vehicle translational velocity and $V_r$ is the wheel rotational velocity, said means including a brake pressure control valve openable to reduce the brake pressure in said system, and means for opening said valve when said slip ratio deviates in either direction from said optimum value and in response to the algebraic sum of two forces, one of said forces being produced in response to and as a function of vehicle translation, the other in response to and as a function of wheel rotation, that force which is a function of vehicle translation being proportional to vehicle translational acceleration and said opening means including integrating means therefor which are capable of initial setting prior to integrating operations, setting means operative prior to a braking transient for maintaining an initial setting of said integrating means proportional to vehicle translational velocity, and means actuated by brake application for disconnecting said setting means from said integrating means.

2. Means for controlling the fluid pressure in a pressure-operated braking system of a wheeled vehicle as defined in claim 1, including accelerometer means responsive to vehicle translational acceleration, said integrating means after disconnection of said setting means integrating the output of said accelerometer means and producing during the ensuing braking transient a valve-operating force combining said initial setting and said integrated output, means operated by the vehicle wheel and producing a valve-operating force proportional to wheel rotational velocity, and means for algebraically summing said forces to operate said valve.

3. Means for controlling the fluid pressure in a pressure-operated braking system of a wheeled vehicle as defined in claim 1, including two accelerometer means responsive respectively to vehicle translational acceleration and wheel rotational acceleration, means for algebraically summing the outputs of said two accelerometer means and applying the algebraic sum thereof to said integrating means, said integrating means after disconnection of said setting means integrating said algebraically summed output and producing during the ensuing braking transient a valve-operating force combining said initial setting and said integrated output, said force operating said valve.

4. Control means as defined in claim 2, together with means for reducing the output of said integrating means to a predetermined fractional proportion which is a function of said optimum slip ratio.

5. Control means as defined in claim 3, together with means for reducing the output of said accelerometer means that is responsive to vehicle translational acceleration to a predetermined fractional proportion which is a function of said optimum slip ratio.

6. Means for controlling the fluid pressure in a pressure-operated braking system of a wheeled vehicle so as to maintain, during a braking transient, an approximately constant optimum value of the slip ratio $$\frac{V_t - V_r}{V_t}$$

between a wheel and its supporting surface, where $V_t$ is the vehicle translational velocity and $V_r$ is the wheel rotational velocity, said means including an electrohydraulic brake pressure control valve and electronic means for energizing said valve in response to deviations from said optimum slip ratio, said electronic means comprising an integrating circuit, means for establishing an initial condition in said integrating circuit that is proportional to vehicle translational velocity at the beginning of a braking transient, means operable at the beginning of a braking transient for disconnecting said initial condition means from said circuit and means for energizing said integrating circuit during the ensuing braking transient and for producing an output signal combining said initial condition and an algebraically summed signal that is a function of $$\frac{V_t - V_r}{V_t}$$

said pressure control valve having electromagnetic actuating means connected to the output of said circuit and also having a valve connected to the fluid pressure braking system and operable by said actuating means to reduce the pressure in said system.

7. Control means as defined in claim 6, said energizing means comprising two accelerometers one responsive to vehicle translational acceleration and producing a signal proportional thereto and the other responsive to wheel rotational acceleration and producing a signal proportional thereto, and circuit means subtracting one of said signals from the other and impressing the difference on said integrating circuit.

8. Control means as defined in claim 7, including means for reducing said translational acceleration signal to a predetermined fractional proportion, said proportion being a function of said optimum slip ratio.

9. Control means as defined in claim 6, said energizing means being responsive to and producing a signal proportional to vehicle translational acceleration, means responsive to wheel rotation for producing a signal proportional to wheel rotational velocity, and means for subtracting said rotational velocity signal from said integrated translational acceleration signal to provide said output for energizing said electrohydraulic control valve.

10. Control means as defined in claim 9 including means for reducing said integrated translational acceleration signal to a predetermined fractional proportion, said proportion being a function of said optimum slip ratio.

11. Control means as defined in claim 9, said means responsive to wheel rotation comprising a tachometer device generating a voltage proportional to its speed of rotation, switch means transmitting said voltage output to said integrating circuit prior to the beginning of a braking transient, and means actuated by operation of said braking system for opening said switch means.

12. Means as defined in claim 1 including a brake operating member, the fluid pressure in said system being a substantially constant supply pressure and said valve having a feed passage through which said constant pressure is applied to said member, said valve also having a movable element controlling said passage and normally maintained in neutral position by balanced forces including pressure feedback from said member and pressure proportional to changes in said algebraic sum, one of said changes causing unbalance of the forces on said element and movement thereof from neutral position to reduce the pressure applied to said member and the pressure feedback therefrom to said valve.

References Cited

UNITED STATES PATENTS 3,022,114   2/1962   Sampietro.
3,292,977   12/1966   Williams.
3,362,757   1/1968   Marcheron.

DUANE A. REGER, *Primary Examiner.*